(12) United States Patent
Shi (10) Patent No.: US 11,924,907 B2
(45) Date of Patent: Mar. 5, 2024

(54) METHOD FOR DISCONTINUOUS TRANSMISSION AND TERMINAL DEVICE

(71) Applicant: GUANGDONG OPPO MOBILE TELECOMMUNICATIONS CORP., LTD., Guangdong (CN)

(72) Inventor: Cong Shi, Guangdong (CN)

(73) Assignee: GUANGDONG OPPO MOBILE TELECOMMUNICATIONS CORP. LTD., Guangdong (CN)

(*) Notice: Subject to any disclaimer, the term of this patent is extended or adjusted under 35 U.S.C. 154(b) by 498 days.

(21) Appl. No.: 17/178,208

(22) Filed: Feb. 17, 2021

(65) Prior Publication Data
US 2021/0176814 A1  Jun. 10, 2021

Related U.S. Application Data

(63) Continuation of application No. PCT/CN2018/101187, filed on Aug. 17, 2018.

(51) Int. Cl.
*H04W 76/28* (2018.01)

(52) U.S. Cl.
CPC .................. *H04W 76/28* (2018.02)

(58) Field of Classification Search
CPC . H04W 76/28; H04W 72/23; H04W 52/0216; H04W 72/0446; H04W 52/0229; H04W 76/27; H04W 52/02; H04W 52/367; H04W 76/11; H04W 72/0453; H04W 52/0235
See application file for complete search history.

(56) References Cited

U.S. PATENT DOCUMENTS

| 2013/0272138 A1* | 10/2013 | Ou | H04W 76/18 |
| | | | 370/241 |
| 2015/0117287 A1* | 4/2015 | Kim | H04W 48/16 |
| | | | 370/311 |
| 2015/0312775 A1* | 10/2015 | Yi | H04W 76/28 |
| | | | 370/254 |
| 2016/0119970 A1* | 4/2016 | Lee | H04W 72/12 |
| | | | 370/328 |

(Continued)

FOREIGN PATENT DOCUMENTS

| CN | 102036347 | 4/2011 |
| CN | 102595573 | 7/2012 |

(Continued)

OTHER PUBLICATIONS

IPI, Office Action for IN Application No. 202127007117, dated Jan. 14, 2022.

(Continued)

*Primary Examiner* — Allahyar Kasraian
(74) *Attorney, Agent, or Firm* — Hodgson Russ LLP (57) ABSTRACT

Discontinuous transmission method and device Disclosed are a discontinuous transmission method and device, capable of improving the discontinuous transmission performance of a terminal device and further reducing the power consumption of the terminal device. The method comprises: the terminal device determines at least one DRX (Continued)

configuration in multiple DRX configurations; and the terminal device detects a physical downlink control channel (PDCCH) according to the at least one DRX configuration.

18 Claims, 3 Drawing Sheets

(56) References Cited

U.S. PATENT DOCUMENTS

| | | | | |
|---|---|---|---|---|
| 2019/0245800 | A1* | 8/2019 | Kim | H04W 28/06 |
| 2020/0037396 | A1* | 1/2020 | Islam | H04W 52/0229 |
| 2020/0100184 | A1* | 3/2020 | Zhang | H04W 52/02 |
| 2020/0120596 | A1* | 4/2020 | Yu | H04W 52/0216 |
| 2020/0245395 | A1* | 7/2020 | Zhang | H04L 5/0053 |
| 2021/0144646 | A1* | 5/2021 | Xu | H04W 76/28 |

FOREIGN PATENT DOCUMENTS

| | | |
|---|---|---|
| EP | 2244518 | 10/2010 |
| JP | 2021534666 A | 12/2021 |
| KR | 20170053669 | 5/2017 |
| WO | 2013051865 | 4/2013 |
| WO | 2013066053 | 5/2013 |
| WO | 2018097680 A1 | 5/2018 |

OTHER PUBLICATIONS

KIPO, Office Action for KR Application No. 10-2021-7004857, dated May 6, 2022.
EPO, Extended European Search Report for EP Application No. 18930174.0, dated Jul. 26, 2021.
InterDigital Inc., "C-DRX with Multiple Configurations," 3GPP TSG-RAN WG2 NR AH#2, R2-1706683, Jun. 2017, 5 pages.
Huawei et al., "Down-selection of DRX mechanism in sTTI," 3GPP TSG-RAN WG2 Meeting #99, R2-1708565, Aug. 2017, 4 pages.
Oppo et al., "UE behaviour on DRX timer operation," 3GPP TSG-RAN2 #101, R2-1801763, Feb. 2018, 7 pages.
WIPO, ISR and WO for PCT/CN2018/101187, dated May 15, 2019.
JPO, Office Acton for JP Application No. 2021-507487, dated Feb. 21, 2023.
JPO, Office Action for JP Application No. 2021-507487, dated Aug. 2, 2022.
Intel Corporation, "C-DRX enhancement in NR," 3GPP TSG RAN WG2 Meeting # 98, R2-1704785, May 2017.
TIPO, First Office Action for TW Application No. 108129374, dated Oct. 27, 2022.

* cited by examiner

METHOD FOR DISCONTINUOUS TRANSMISSION AND TERMINAL DEVICE

CROSS-REFERENCE

This application is a continuation of International Patent Application No. PCT/CN2018/101187, filed Aug. 17, 2018, the entire disclosure of which is incorporated herein by reference.

TECHNICAL FIELD

The embodiments of the present application relate to the field of communications, and more specifically, to a method and device for Discontinuous Reception (DRX).

BACKGROUND

In consideration of power saving of a terminal device, DRX mechanism is introduced. The network device can configure the terminal device to "wake up" at the time predicted by the network device and monitor the downlink control channel when it wakes up, or configure the terminal device to "sleep" at the time predicted by the network device and does not monitor the downlink control channel during the sleep. In this way, if the network device has data to be transmitted to the terminal device, the terminal device can be scheduled during the wake-up time of the terminal device, and the terminal device can reduce power consumption during the sleep time.

Bandwidth Part (BWP) is introduced in new radio (NR). The terminal device can support multiple BWPs, and can switch between the supported BWPs. In order to satisfy different types of services scheduled on different BWPs, the network device can configure different Control Recourse Sets (CORESETs) and Search Spaces on different BWPs.

SUMMARY

The embodiments of the present application provide a method and device for discontinuous reception.

In a first aspect, a method for discontinuous reception is provided, including: determining, by a terminal device, at least one DRX configuration in a plurality of DRX configurations; and detecting by the terminal device a physical downlink control channel (PDCCH) according to the at least one DRX configuration.

In a second aspect, a method for discontinuous reception is provided, including: sending by a network device a plurality of DRX configurations to a terminal device, where the plurality of DRX configurations are used for the terminal device to determine at least one DRX configuration for detecting a physical downlink control channel (PDCCH).

In a third aspect, a terminal device is provided, which can perform the method in the foregoing first aspect or any optional implementation of the first aspect. Specifically, the terminal device can include a functional module for performing the method in the foregoing first aspect or any possible implementation of the first aspect.

In a fourth aspect, a network device is provided, which can perform the method in the foregoing second aspect or any optional implementation of the second aspect. Specifically, the network device can include a functional module for performing the method in the foregoing second aspect or any possible implementation of the second aspect.

In a fifth aspect, there is provided a terminal device including a processor and a memory. The memory is used for storing a computer program, and the processor is configured to call and run the computer program stored in the memory to perform the method in the above-mentioned first aspect or any possible implementation of the first aspect.

In a sixth aspect, there is provided a network device including a processor and a memory. The memory is used for storing a computer program, and the processor is configured to call and run the computer program stored in the memory to perform the method in the above-mentioned second aspect or any possible implementation of the second aspect.

In a seventh aspect, a chip is provided to implement the method in the foregoing first aspect or any possible implementation of the first aspect. Specifically, the chip includes a processor configured to call and run a computer program from a memory to cause the device installed with the chip to perform the method in the first aspect or any possible implementation of the first aspect.

In an eighth aspect, a chip is provided to implement the method in the foregoing second aspect or any possible implementation of the second aspect. Specifically, the chip includes a processor configured to call and run a computer program from a memory to cause the device installed with the chip to perform the method in the second aspect or any possible implementation of the second aspect.

In a ninth aspect, a computer-readable storage medium is provided for storing a computer program that causes a computer to perform the method in the above-mentioned first aspect or any possible implementation of the first aspect.

In a tenth aspect, a computer-readable storage medium is provided for storing a computer program that causes a computer to perform the method in the above-mentioned second aspect or any possible implementation of the second aspect.

In an eleventh aspect, a computer program product is provided, including computer program instructions that cause a computer to perform the method in the foregoing first aspect or any possible implementation of the first aspect.

In an twelfth aspect, a computer program product is provided, including computer program instructions that cause a computer to perform the method in the foregoing second aspect or any possible implementation of the second aspect.

In a thirteenth aspect, a computer program is provided, which when running on a computer, causes the computer to perform the method in the first aspect or any possible implementation of the first aspect.

In a fourteenth aspect, a computer program is provided, which when running on a computer, causes the computer to perform the method in the second aspect or any possible implementation of the second aspect.

In a fifteenth aspect, a communication system is provided, including a terminal device and a network device.

Wherein the terminal device is configured to: determine a target DRX configuration to be used among a plurality of DRX configurations, the target DRX configuration including one or more DRX configurations; and detect a physical downlink control channel (PDCCH) based on the target DRX configuration.

Wherein the network terminal device is configured to determine the plurality of DRX configurations, the plurality of DRX configurations being used for the terminal device to determine the target DRX configuration to be used, the target parameter group including one or more DRX configurations, and the target DRX configuration being used for the terminal device to detect the physical downlink control channel (PDCCH); and send DRX configuration information to the terminal device, the DRX configuration information including information of the plurality of DRX configurations.

Wherein the terminal device is configured to perform the method in the first aspect or any possible implementation of the first aspect, and the network device is configured to perform the method in the second aspect or any possible implementation of the second aspect.

DETAILED DESCRIPTION

The technical solutions in the embodiments of the present application will be described below in conjunction with the drawings in the embodiments of the present application. Obviously, the described embodiments are part of the embodiments of the present application, but not all the embodiments. Based on the embodiments in the present application, all other embodiments obtained by those of ordinary skill in the art without creative work fall within the protection scope of the present application.

The technical solutions of the embodiments of the present disclosure can be applied to various communication systems, such as a Global System of Mobile Communication (GSM) system, a Code Division Multiple Access (CDMA) system, a Wideband Code Division Multiple Access (WCDMA) system, a General Packet Radio Service (GPRS), a Long Term Evolution (LTE) system, a LTE Frequency Division Duplex (FDD) system, a LTE Time Division Duplex (TDD) system, an Advanced long term evolution (LTE-A) system, a New Radio (NR) system, an evolution system of a NR system, a LTE-based access to unlicensed spectrum (LTE-U) system, a NR-based access to unlicensed spectrum (NR-U) system, an Universal Mobile Telecommunication System (UMTS), a Global Interoperability for Microwave Access (WiMAX) communication system, Wireless Local Area Networks (WLAN), Wireless Fidelity (Wi-Fi), next-generation communication systems, other communication systems, or the like.

Generally speaking, traditional communication systems support a limited number of connections and are easy to implement. However, with the development of communication technologies, mobile communication systems will not only support traditional communications, but will also support, for example, Device to Device (D2D) communication, machine to machine (M2M) communication, machine type communication (MTC), vehicle to vehicle (V2V) communication, etc. The embodiments of the present application can also be applied to these communication systems.

Optionally, the communication system in the embodiments of the present application can be applied to a Carrier Aggregation (CA) scenario, a Dual Connectivity (DC) scenario, or a Standalone (SA) deployment scenario.

Figure 1:
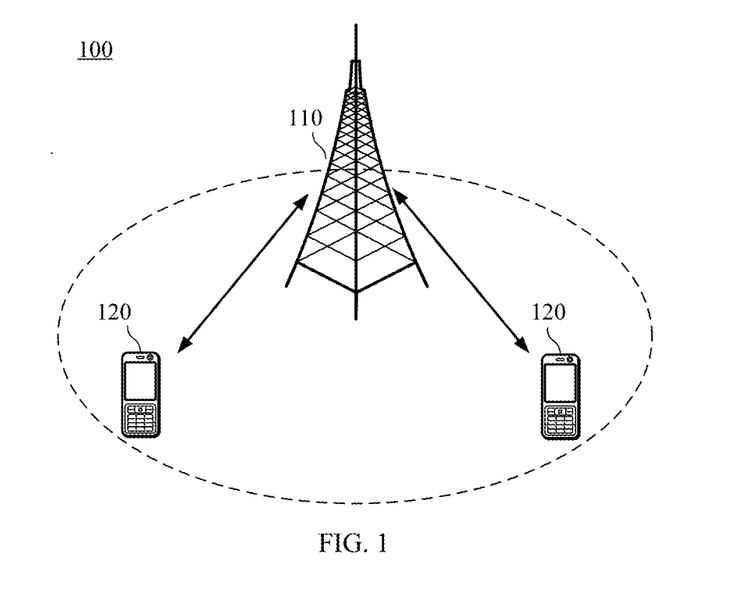
FIG. 1 is a schematic diagram of a wireless communication system according to an embodiment of the present application.

Exemplarily, a communication system 100 to which an embodiment of the present application is applied is shown in FIG. 1. The wireless communication system 100 can include a network device 110. The network device 110 can be a device that communicates with a terminal device. The network device 110 can provide communication coverage for a specific geographic area, and can communicate with terminal devices located in the coverage area. Optionally, the network device 100 may be a Base Transceiver Station (BTS) in a GSM system or a CDMA system, a NodeB (NB) in a WCDMA system, an Evolutional Node B (eNB or eNodeB), a network side device in a NR system, or a wireless controller in a Cloud Radio Access Network (CRAN), or the network device can be a relay station, an access point, an in-vehicle device, a wearable device, a network-side device in a next-generation network, a network device in the future evolutional Public Land Mobile Network (PLMN), or the like.

The wireless communication system 100 also includes at least one terminal device 120 located within the coverage area of the network device 110. As used herein, "terminal device" includes, but is not limited to, a device which communicates via a wired line connection, such as a public switched telephone networks (PSTN), a digital subscriber line (DSL), a digital cable, and a direct cable connection; via another data connection/network; and/or via a wireless interface, such as those for a cellular network, a wireless local area network (WLAN), a digital TV network such as a DVB-H network, a satellite network or an AM-FM broadcast transmitter; a device of another terminal device that is configured to receive/send communication signals; and/or an Internet of Things (IoT) device. The terminal device which is configured to communicate through a wireless interface may be referred to as a "wireless communication terminal", a "wireless terminal" or a "mobile terminal".

The terminal device 120 may be mobile or fixed. Optionally, the terminal device 120 may refer to an access terminal, User Equipment (UE), a user unit, a user station, a mobile station, a moving station, a remote station, a remote terminal, a mobile device, a user terminal, a terminal, a wireless communication device, a user agent or a user device. The access terminal can be a cellular phone, a cordless phone, a Session Initiation Protocol (SIP) phone, a Wireless Local Loop (WLL) station, a Personal Digital Assistant (PDA), a handheld device with a wireless communication function, a computing device or other processing devices connected to a wireless modem, an on-board device, a wearable device, a terminal device in the future 5G network, a terminal device in a future evolutional PLMN, or the like. Optionally, Device to Device (D2D) communication may also be performed between the terminal devices 120.

Specifically, the network device 110 can provide services for a cell, and the terminal device 120 communicates with the network device 110 through transmission resources (for example, frequency domain resources, or spectrum resources) used by the cell. The cell may be a cell corresponding to the network device 110 (e.g., a cell corresponding to the base station), or belong to a macro base station or a base station corresponding to a small cell. The small cell herein can include a Metro cell, a Micro cell, a Pico cell, a Femto cell, etc., which are characterized in small coverage and low transmission power, and are suitable for providing high-rate data transmission services.

FIG. 1 exemplarily shows one network device and two terminal devices. Optionally, the wireless communication system 100 may include multiple network devices, and other numbers of terminal devices may be included in the coverage of each of the network devices, which are not limited in the embodiments of the present application. Optionally, the wireless communication system 100 may also include other network entities such as a network controller and a mobility management entity, which are not limited in the embodiments of the present application.

Figure 2:
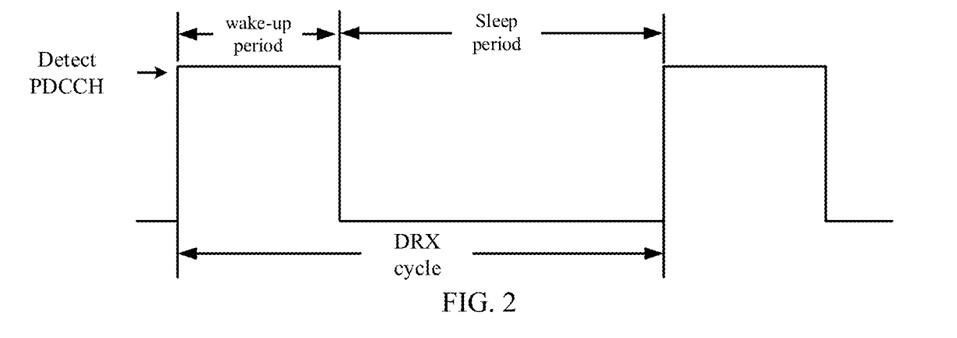
FIG. 2 is a schematic diagram of a DRX cycle.

A Media Access Control (MAC) entity (MAC entity) is configured with DRX function by Radio Resource Control (RRC) to control the terminal device to monitor behaviors of Physical Downlink Control Channels (PDCCHs). For example, as shown in FIG. 2, in a RRC CONNECTED mode, if the terminal device is configured with the DRX function, the MAC entity can continuously monitor the PDCCH during the wake-up period (On Duration), and does not monitor the PDCCH during the sleep period (Opportunity for DRX), thereby reducing the power consumption of the terminal device. The network device can configure a set of DRX parameters for the MAC entity through RRC signaling to manage the wake-up and sleep states of the terminal device. A DRX cycle can be obtained according to values of these parameters, as shown in FIG. 2.

The BWP is introduced in NR. The terminal device in the connected state can support up to 4 downlink BWPs and up to 4 uplink BWPs. At the same time, the terminal device uses at most one BWP at a time. The terminal device can switch between the BWPs. For example, the network device can dynamically control the terminal device to switch the downlink BWP or the uplink BWP by sending Download Control Information (DCI), so as to achieve scheduling flexibility and save power consumption. In addition, for the downlink BWP, the control resource set (CORESET) and search space can be configured for the BWP dedicated to each terminal device, so that the terminal device can detect the physical downlink control channel (PDCCH) on the BWP.

Currently, the DRX parameters are configured for each MAC entity, that is, the DRX parameters apply to the CORESETs and search spaces configured on all BWPs. In a DRX cycle, if the terminal device is in the DRX active time, it needs to blindly detect all possible PDCCH transmission positions on the currently activated downlink BWP, and if the PDCCH is detected on any possible PDCCH transmission position and the PDCCH schedules a new uplink or downlink data transmission, a drx-InactivityTimer will be reset.

It can be seen that since the configuration of DRX parameters is not flexible enough, it is difficult to meet service transmission requirements on different BWPs. For example, for one BWP, the network device may expect the BWP to be used for scheduling delay-sensitive services, and the network device may configure a relative short cycle for the search space on this BWP. For another BWP, the network device may expect the BWP to be used for scheduling services with high rate requirements, and the network device may configure a relatively long cycle for the search space on this BWP. The DRX parameters are configured for each MAC entity. Therefore, even if the BWP of the terminal device is switched, the DRX parameters cannot meet the service transmission requirements on the BWP.

Therefore, according the embodiments of the present application, it is proposed that multiple DRX configurations can be configured, for example, multiple DRX configurations can be configured for one MAC entity, so that the terminal device can flexibly select an appropriate DRX configuration among the plurality of DRX configurations and detect the PDCCH based on the selected DRX configuration, thereby improving the performance of the discontinuous reception of the terminal device and further reducing the power consumption of the terminal device.

It should be understood that the detecting described in the embodiments of the present application may also be referred to as monitoring, listening, detection, or the like.

Figure 3:
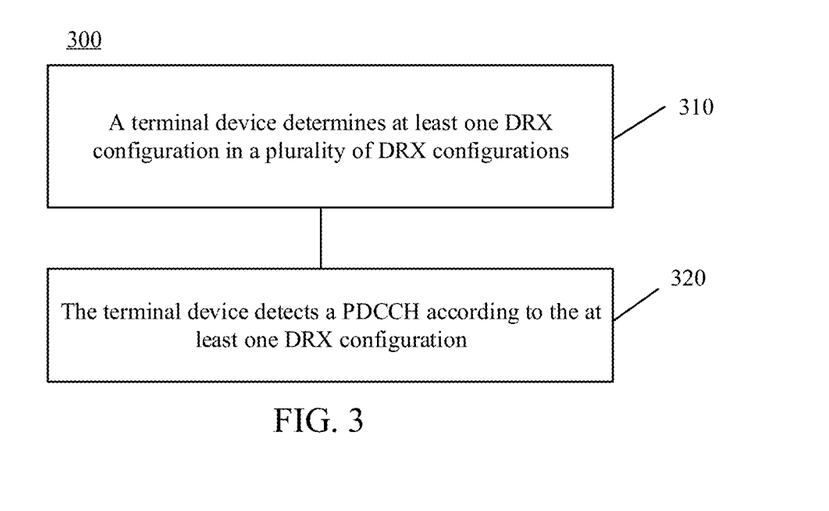
FIG. 3 is a schematic flowchart of a discontinuous reception method according to an embodiment of the present application.

FIG. 3 is a schematic flowchart of a discontinuous reception method 300 according to an embodiment of the present application. The method shown in FIG. 3 may be performed by a terminal device which may be, for example, the terminal device 120 shown in FIG. 1. As shown in FIG. 3, the discontinuous reception method 300 includes the following.

In 310, the terminal device determines at least one DRX configuration in a plurality of DRX configurations.

In 320, the terminal device detects a PDCCH according to the at least one DRX configuration.

Specifically, a plurality of DRX configurations that can be used for discontinuous reception of the terminal device can be configured, for example, the plurality of DRX configurations can be configured for one MAC entity, so that the terminal device can select a suitable DRX configuration in the plurality of DRX configurations as a to-be-used DRX, and detect PDCCH based on DRX parameters in the selected DRX configuration.

Wherein, each DRX configuration may include, for example, at least one of the following parameters:

drx-onDurationTimer: duration from the beginning of the DRX cycle;

drx-SlotOffset: a slot offset after starting the drx-onDurationTimer;

drx-StartOffset: a subframe where the DRX cycle starts;

drx-InactivityTimer: duration after PDCCH occasion in which a PDCCH indicates a new uplink or downlink transmission for the MAC entity;

drx-RetransmissionTimerDL: the maximum duration until a downlink retransmission is received (per downlink Hybrid Automatic Repeat reQuest (HARQ) process);

drx-RetransmissionTimerUL: the maximum duration until a grant for uplink retransmission is received (per uplink HARQ process);

drx-LongCycle: the long DRX cycle;

drx-ShortCycle: the short DRX cycle;

drx-ShortCycleTimer: the duration the UE uses the DRX short cycle;

drx downlink HARQ Round-Trip Time (RTT) timer (drx-HARQ-RTT-TimerDL): the minimum duration before a DL assignment for DL retransmission is expected by the MAC entity;

drx-HARQ-RTT-TimerUL: the minimum duration before a UL retransmission grant is expected by the MAC entity; and mac-ContentionResolutionTimer.

Optionally, before 310, the method may further include the terminal device receiving the plurality of DRX configurations sent by the network device; or the terminal device obtaining the plurality of DRX configurations pre-stored in the terminal device.

That is, the plurality of DRX configurations may be configured by the network device, that is, determined by the network device and sent to the terminal device, or the plurality of DRX configurations may be pre-configured, for example, agreed in advance in the protocol.

Optionally, each DRX configuration in the plurality of DRX configurations corresponds to at least one resource configuration. Optionally, the at least one resource configuration includes at least one of the following configurations: a serving cell configuration, a BWP configuration, a CORESET configuration, and a search space configuration.

In 320, the terminal device detecting the PDCCH according to the at least one DRX configuration includes: the terminal device detecting the PDCCH according to each DRX configuration and the resource configuration corresponding to each DRX configuration.

Specifically, when the terminal device uses a certain resource configuration for PDCCH detection, the DRX configuration used for the PDCCH detection should be the DRX configuration corresponding to the resource configuration. In other words, when the terminal device uses a certain DRX configuration for PDCCH detection, the resource configuration used for PDCCH detection should be the resource configuration corresponding to the DRX configuration. For example, each DRX configuration corresponds to K1 serving cell configurations, K2 BWP configurations, K3 CORESET configurations, and/or K4 search space configurations, where K1, K2, K3, and K4 are positive integers.

Because the resource configuration for PDCCH detection such as the BWP configuration or the like can be flexibly switched to meet the transmission requirements of different services, in the embodiments of the present application, the terminal device performs the PDCCH detection by selecting the DRX configuration corresponding to the resource configuration, thereby meeting the service transmission requirements under different resource configurations, improving the performance of the discontinuous reception of the terminal device, and further reducing the power consumption of the terminal device.

For example, assuming that the resource configuration is the BWP configuration, the correspondence between the DRX configuration and the BWP is shown in Table 1. DRX configuration 1 corresponds to BWP 1 and BWP 2, so the terminal device can perform PDCCH detection on BWP 1 or BWP 2 based on DRX configuration 1. DRX configuration 2 corresponds to BWP 3, so the terminal device can perform the PDCCH detection on BWP on 3 based on DRX configuration 2; . . . ; DRX configuration M corresponds to BWP N, so the terminal device can perform the PDCCH detection on BWP N based on DRX configuration M.

TABLE 1

| BWP | DRX configuration |
| --- | --- |
| BWP 1 | DRX configuration 1 |
| BWP 2 | |
| BWP 3 | DRX configuration 2 |
| . . . | . . . |
| BWP N | DRX configuration M |

For another example, assuming that the resource configuration is the serving cell configuration, the correspondence between the DRX configuration and the serving cell is shown in Table 2. DRX configuration 1 corresponds to serving cell 1, and when the serving cell of the terminal device is serving cell 1, the PDCCH detection can be performed in serving cell 1 based on DRX configuration 1; DRX configuration 2 corresponds to serving cell 2, and when the serving cell of the terminal device is serving cell 2, the PDCCH detection can be performed in serving cell 2 based on DRX configuration 2; . . . ; DRX configuration M corresponds to serving cell K, and when the serving cell of the terminal device is serving cell K, the PDCCH detection can be performed in serving cell K based on DRX configuration M.

TABLE 2

| Serving cell | DRX configuration |
| --- | --- |
| Serving cell 1 | DRX configuration 1 |
| Serving cell 2 | DRX configuration 2 |
| . . . | . . . |
| Serving cell K | DRX configuration M |

Each DRX configuration may correspond to at least one resource configuration, and further, the at least one resource configuration may include different types of resource configurations. For example, a certain DRX configuration may correspond to one serving cell configuration and at least one BWP configuration. When the serving cell of the terminal device is the one serving cell, the PDCCH detection can be performed on the at least one BWP corresponding to the DRX configuration based on the DRX configuration.

Optionally, the at least one resource configuration corresponding to each DRX configuration may include BWP configurations belonging to the same serving cell and/or BWP configurations belonging to different serving cells; and/or the at least one resource configuration corresponding to each DRX configuration may include CORESET configurations belonging to the same BWP and/or CORESET configurations belonging to different BWPs; and/or at least one resource configuration corresponding to each DRX configuration may include search space configurations belonging to the same BWP and/or Search space configurations belonging to different BWPs.

For example, as shown in Table 3, DRX configuration 1 corresponds to BWP 1 and BWP 2 of serving cell 1; DRX configuration 2 corresponds to BWP 3 of serving cell 1 and BWP 3 of serving cell 2; DRX configuration 3 corresponds to BWP 1 and BWP 2 of serving cell 2; . . . ; DRX configuration M corresponds to BWP N of serving cell K. The terminal device can use DRX configuration 1 to perform the PDCCH detection on BWP 1 or BWP 2 of serving cell 1, or use DRX configuration 2 to perform the PDCCH detection on BWP 3 of serving cell 1 and BWP 3 of serving cell 2 at the same time, or use DRX configuration 3 to perform the PDCCH detection on BWP 1 or BWP 2 of serving cell 2.

TABLE 3

| Serving cell | BWP | DRX configuration |
| --- | --- | --- |
| Serving cell 1 | BWP 1 | DRX configuration 1 |
| | BWP 2 | |
| | BWP 3 | DRX configuration 2 |
| Serving cell 2 | BWP 3 | |
| | BWP 2 | DRX configuration 3 |
| | BWP 1 | |
| . . . | . . . | . . . |
| Serving cell K | BWP N | DRX configuration M |

Figure 4:
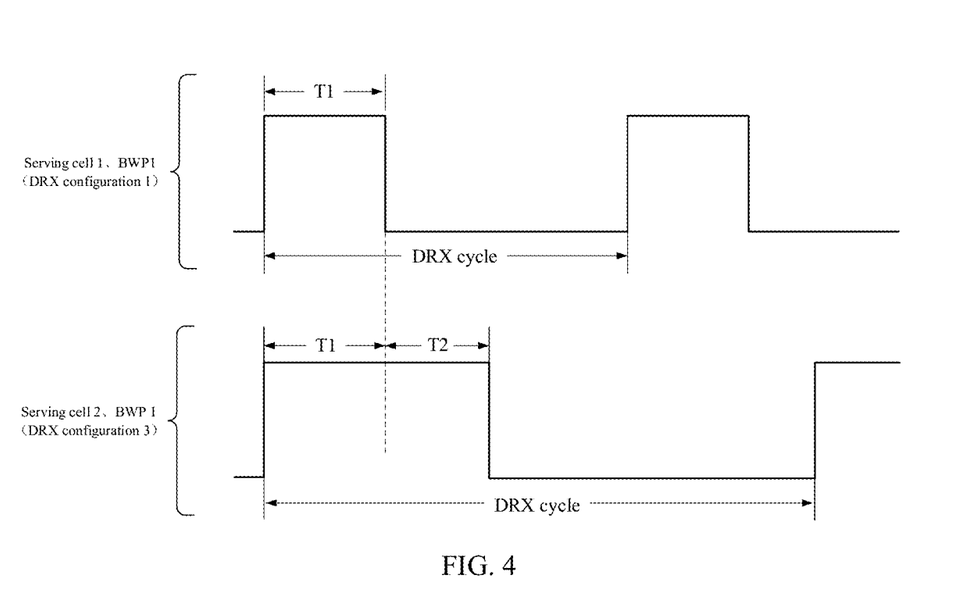
FIG. 4 is a schematic diagram of correspondence between DRX configurations and resource configurations according to an embodiment of the present application.

Referring to FIG. 4, taking BWP 1 of serving cell 1 and BWP 1 of serving cell 2 in Table 3 as an example, BWP 1 of serving cell 1 corresponds to DRX configuration 1, and BWP 1 of serving cell 2 corresponds to DRX configuration 3. DRX configuration 1 and DRX configuration 3 respectively correspond to the DRX cycles shown in the upper and lower parts of FIG. 4, where the On Duration in DRX configuration 1 is T1, and the On Duration in DRX configuration 3 is T1+T2. Within time period T1, the terminal device can perform the PDCCH detection on BWP 1 of serving cell 1 and BWP 1 of serving cell 2, and within time period T2, the terminal device can perform the PDCCH detection only on BWP 1 of serving cell 2.

For another example, as shown in Table 4, DRX configuration 1 corresponds to CORESET 1 in BWP 1; DRX configuration 2 corresponds to CORESET 2 in BWP 1; DRX configuration 3 corresponds to CORESET 3 in BWP 1; DRX configuration 4 corresponds to CORESET 1, CORESET 2 and CORESET 3 in BWP 2; DRX configuration M corresponds to CORESET 1, CORESET 2 and CORESET 3 in BWP N.

TABLE 4

| BWP | CORESET | DRX configuration |
|---|---|---|
| BWP 1 | CORESET 1 | DRX configuration 1 |
|  | CORESET 2 | DRX configuration 2 |
|  | CORESET 3 | DRX configuration 3 |
| BWP 2 | CORESET 1 | DRX configuration 4 |
|  | CORESET 2 |  |
|  | CORESET 3 |  |
| ... | ... | ... |
| BWP N | CORESET 1 | DRX configuration M |
|  | CORESET 2 |  |
|  | CORESET 3 |  |

The at least one resource configuration corresponding to each DRX configuration as described above may be reflected in the form of a mapping table. The mapping table may be specified by a protocol or configured by a network device for a terminal device. Alternatively, the correspondence between the DRX configuration and the resource configuration can also be represented in any other manners such as tables, formulas, and drawings. For example, each DRX configuration may include an index of the resource configuration corresponding to the DRX configuration, and the terminal device may know the resource configuration corresponding to each DRX configuration when obtaining the DRX configuration; and/or each resource configuration may include an index of the DRX configuration corresponding to the resource configuration, and the terminal device can know the DRX configuration corresponding to each resource configuration when obtaining the resource configuration.

For example, taking Table 3 as an example, in addition to various DRX parameters, DRX configuration 1 carries serving cell index 1, BWP index 1 and BWP index 2, so that the terminal device can know that this DRX configuration corresponds to the serving cell indicated by index 1, and corresponds to the BWPs indicated by index 1 and index 2.

The embodiments of the present application provide the following two manners for determining the at least one DRX configuration to be used in the plurality of DRX configurations, which are respectively described below.

Manner 1

Optionally, in 310, the terminal device determines at least one DRX configuration in the plurality of DRX configurations, including that the terminal device determines the at least one DRX configuration according to an activated and/or deactivated resource configuration, where the at least one resource configuration corresponding to each DRX configuration in the at least one DRX configuration includes the activated resource configuration and does not include the deactivated DRX configuration.

In manner 1, the terminal device can determine the DRX configuration to be used according to the activated state and/or deactivated state of the current resource configuration, can determine that the DRX configuration corresponding to the activated resource configuration belongs to the at least one DRX configuration, and determine that the DRX configuration corresponding to the deactivated resource configuration does not belong to the at least one DRX configuration. The terminal device may select the DRX configuration corresponding to the activated resource configuration among the plurality of DRX configurations, as the DRX configuration to be used for PDCCH detection.

For example, assuming that the mapping relationship shown in Table 2 is used, when serving cell 1 is activated, DRX configuration 1 corresponding to serving cell 1 is also activated, so that the terminal device can use the DRX configuration 1 to perform the PDCCH detection in serving cell 1; when serving cell 2 is activated and serving cell 1 is deactivated, DRX configuration 2 corresponding to serving cell 2 is also activated, and DRX configuration 1 corresponding to serving cell 1 will be deactivated, so that the terminal device can use the DRX configuration 2 to perform the PDCCH detection in serving cell 2, and will not use DRX configuration 1 to perform the PDCCH detection in serving cell 1.

For another example, assuming that the mapping relationship shown in Table 3 is used, when BWP 1 and/or BWP 2 of serving cell 1 are activated, the terminal device activates DRX configuration 1, so that the terminal device can use DRX configuration 1 to perform the PDCCH detection on BWP 1 and/or BWP2 of serving cell 1; when serving cell 1 is activated and BWP 3 is activated, the terminal device activates DRX configuration 2, so that the terminal device can use DRX configuration 2 to perform the PDCCH detection on BWP 3 of serving cell 1; when serving cell 2 is activated and BWP 3 is activated, the terminal device activates DRX configuration 2, so that the terminal device can use DRX configuration 2 to perform the PDCCH detection on BWP 3 of serving cell 2; when BWP 1 and/or BWP 2 of serving cell 2 are activated, the terminal device activates the DRX configuration 3, so that the terminal device can use DRX configuration 3 to perform the PDCCH detection on the BWP 1 and/or BWP 2 of the serving cell 2. Similarly, when a certain serving cell or BWP is deactivated, the corresponding DRX configuration will also be deactivated.

Manner 2

Optionally, in 310, the terminal device determines the at least one DRX configuration in the plurality of DRX configurations, including that the terminal device determines the at least one DRX configuration according to indication information received from the network device. The indication information is used to indicate activated and/or deactivated DRX configurations, and the at least one DRX configuration includes the activated DRX configuration and does not include the deactivated DRX configuration.

In manner 2, the network device may send indication information to indicate the DRX configuration that is required to be activated or deactivated, and the network device may simultaneously indicate to activate or deactivate one or more DRX configurations. The terminal device can use the activated DRX configuration(s) and the corresponding resource configuration(s) to detect the PDCCH, and does not use the deactivated DRX configuration(s) or the corresponding resource configuration(s) to detect the PDCCH.

The indication information may be carried in DCI, MAC CE or RRC signaling, for example.

It should be understood that in the embodiments of the present application, the activated DRX configuration means that the terminal device needs to detect the PDCCH based on such DRX configuration, that is, the terminal device needs to detect the PDCCH by the behaviors specified by the parameters in the activated DRX configuration; and the deactivated DRX configuration means that the terminal device does not need to detect the PDCCH based on such DRX configuration, that is, the terminal device does not need to detect the PDCCH by the behaviors specified by the parameters in the deactivated DRX configuration.

Further, optionally, the method further includes: the terminal device activating a first resource configuration, where the first resource configuration corresponds to the activated DRX configuration; and/or the terminal device deactivating a second resource configuration, where the second resource configuration corresponds to the deactivated DRX configuration.

That is, after the terminal device determines the DRX configuration that needs to be activated, it activates the DRX configuration and activates the resource configuration corresponding to the DRX configuration. After determining the DRX configuration that needs to be deactivated, the terminal device deactivates the DRX configuration and deactivates the resource configuration corresponding to the DRX configuration.

For example, assuming that the mapping relationship shown in Table 1 is used, when DRX configuration 1 is activated, BWP 1 and BWP 2 corresponding to serving cell 1 are also activated, so that the terminal device can use the DRX configuration 1 to perform the PDCCH detection in BWP 1 or BWP 2; when DRX configuration 2 is activated and DRX configuration 1 is deactivated, BWP 3 corresponding to DRX configuration 2 is also activated, and BWP 1 and BWP 2 corresponding to DRX configuration 1 will be deactivated, so that the terminal device can use this DRX configuration 2 to perform the PDCCH detection on BWP 3, and will not use DRX configuration 1 to perform the PDCCH detection on BWP 1 or BWP 2.

Figure 5:
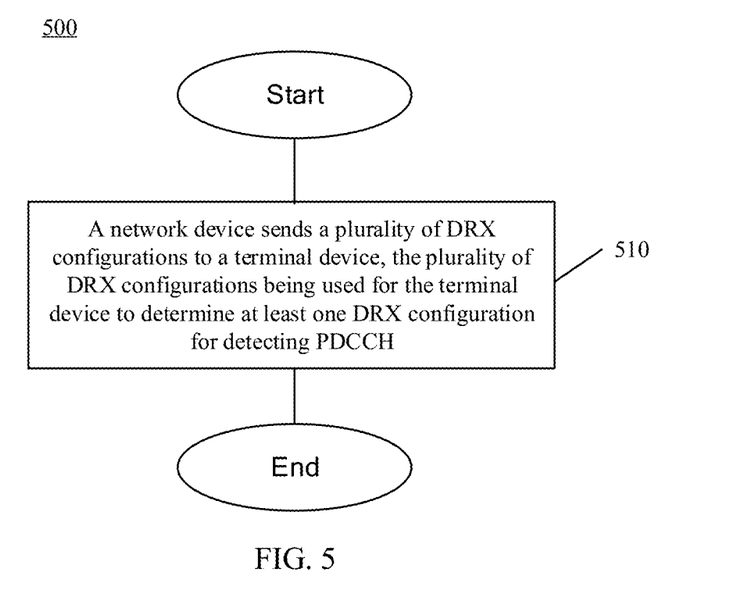
FIG. 5 is a schematic flowchart of a discontinuous reception method according to an embodiment of the present application.

FIG. 5 is a schematic flowchart of a discontinuous transmission method 500 according to an embodiment of the present application. The method shown in FIG. 5 may be performed by a network device, and the network device may be, for example, the network device 110 shown in FIG. 1. As shown in FIG. 5, the discontinuous transmission method 500 includes the following.

In 510, the network device sends a plurality of DRX configurations to a terminal device, where the plurality of DRX configurations are used for the terminal device to determine at least one DRX configuration for detecting a physical downlink control channel (PDCCH).

Therefore, the network device sends a plurality of DRX configurations to the terminal device, and the plurality of DRX configurations may be configured for one MAC entity, so that the terminal device can flexibly select an appropriate DRX configuration among the plurality of DRX configurations, and detect the PDCCH based on the selected DRX configuration, thereby improving the discontinuous reception performance of the terminal device and further reducing the power consumption of the terminal device.

Optionally, each DRX configuration in the plurality of DRX configurations corresponds to at least one resource configuration, and the at least one resource configuration includes at least one of the following configurations: a serving cell configuration, a bandwidth part (BWP) configuration, a control resource set (CORESET) configuration and a search space configuration; where each DRX configuration and the resource configuration corresponding to each DRX configuration are used for the terminal device to detect the PDCCH.

Optionally, each DRX configuration includes an index of a resource configuration corresponding to each DRX configuration.

Optionally, each resource configuration includes an index of the DRX configuration corresponding to each resource configuration.

Optionally, the method further includes: the network device sending indication information to the terminal device, where the indication information is used to indicate the at least one DRX configuration.

Optionally, the indication information is carried in downlink control information (DCI), media access control (MAC) control element (CE), or radio resource control (RRC) signaling.

Optionally, the at least one resource configuration corresponding to each DRX configuration includes BWP configurations belonging to the same serving cell and/or BWP configurations belonging to different serving cells; the at least one resource configuration includes CORESET configurations belonging to the same BWP and/or CORESET configurations belonging to different BWPs; and/or the at least one resource configuration includes search space configurations belonging to the same BWP and/or search space configurations belonging to different BWPs.

Optionally, each DRX configuration includes at least one of the following parameters: drx-onDurationTimer, drx-SlotOffset, drx-StartOffset, drx-InactivityTimer, drx-RetransmissionTimerDL, drx-RetransmissionTimerUL, drx-LongCycle, drx-ShortCycle, drx-ShortCycleTimer, drx-HARQ-RTT-TimerDL, drx-HARQ-RTT-TimerUL, and mac-ContentionResolutionTimer.

It should be noted that the various embodiments described in this application and/or the technical features in each embodiment can be combined with each other arbitrarily without conflict, and the technical solutions obtained from the combination should also fall within the protection scope of this application.

It should be understood that in the embodiments of the present application, the sequence number of the above-mentioned processes does not mean the performing order, and the performing order of the processes should be determined according to the functions and the internal logic thereof, and should not be limited in the implementations of the embodiments of the present application.

The communication method according to the embodiments of the present application has been described above in detail. A device according to the embodiments of the present application will be described below in conjunction with FIG. 7 to FIG. 10. The technical features described in the method embodiments are applicable to the following device embodiments.

Figure 6:
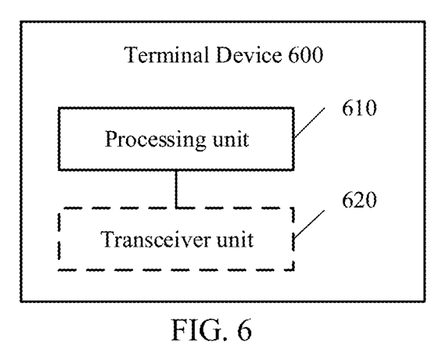
FIG. 6 is a schematic block diagram of a terminal device according to an embodiment of the present application.

FIG. 6 is a schematic block diagram of a terminal device 600 according to an embodiment of the present application. As shown in FIG. 6, the terminal device 600 includes a processing unit 610, and the processing unit 610 is configured to:

determine at least one DRX configuration in a plurality of DRX configurations; and detect a physical downlink control channel (PDCCH) according to the at least one DRX configuration.

Accordingly, a plurality of DRX configurations are configured, for example, for the same MAC entity, so that the terminal device can flexibly select a suitable DRX configuration among the plurality of DRX configurations, and detect the PDCCH based on the selected DRX configuration, thereby improving the discontinuous reception performance of the terminal device and further reducing the power consumption of the terminal device.

Optionally, the plurality of DRX configurations are configured for a same media access control (MAC) entity.

Optionally, each DRX configuration in the plurality of DRX configurations corresponds to at least one resource configuration, and the at least one resource configuration includes at least one of the following configurations: a serving cell configuration, a bandwidth part (BWP) configuration, a control resource set (CORESET) configuration and a search space configuration;

wherein the processing unit 610 is specifically configured to: detect the PDCCH according to each DRX configuration and a resource configuration corresponding to each DRX configuration.

Optionally, each DRX configuration includes an index of a resource configuration corresponding to each DRX configuration.

Optionally, each resource configuration includes an index of the DRX configuration corresponding to each resource configuration.

Optionally, the processing unit 610 is specifically configured to: determine the at least one DRX configuration according to an activated and/or deactivated resource configuration, where the at least one resource configuration corresponding to each DRX configuration in the at least one DRX configuration includes the activated resource configuration and does not include the deactivated resource configuration.

Optionally, the processing unit 610 is specifically configured to: determine the at least one DRX configuration according to indication information received from the network device, where the indication information is used to indicate an activated and/or deactivated DRX configuration, and the at least one DRX configuration includes the activated DRX configuration and does not include the deactivated DRX configuration.

Optionally, the indication information is carried in downlink control information (DCI), media access control (MAC) control element (CE), or radio resource control (RRC) signaling.

Optionally, the processing unit 610 is further configured to: activate a first resource configuration, where the first resource configuration corresponds to an activated DRX configuration; and/or deactivate a second resource configuration, where the second resource configuration corresponds to a deactivated DRX configuration.

Optionally, the terminal device further includes a transceiving unit 620 configured to: receive the plurality of DRX configurations sent by the network device; or the processing unit 610 is further configured to obtain the plurality of DRX configurations pre-stored in the terminal device.

Optionally, the at least one resource configuration corresponding to each DRX configuration includes BWP configurations belonging to the same serving cell and/or BWP configurations belonging to different serving cells; the at least one resource configuration includes CORESET configurations belonging to the same BWP and/or CORESET configurations belonging to different BWPs; and/or the at least one resource configuration includes search space configurations belonging to the same BWP and/or search space configurations belonging to different BWPs.

Optionally, each DRX configuration includes at least one of the following parameters: drx-onDurationTimer, drx-SlotOffset, drx-StartOffset, drx-InactivityTimer, drx-RetransmissionTimerDL, drx-RetransmissionTimerUL, drx-LongCycle, drx-ShortCycle, drx-ShortCycleTimer, drx-HARQ-RTT-TimerDL, drx-HARQ-RTT-TimerUL, and mac-ContentionResolutionTimer.

It should be understood that the terminal device 600 can perform the corresponding operations performed by the terminal device in the foregoing method 300, which will be not be repeated here for the sake of brevity.

Figure 7:
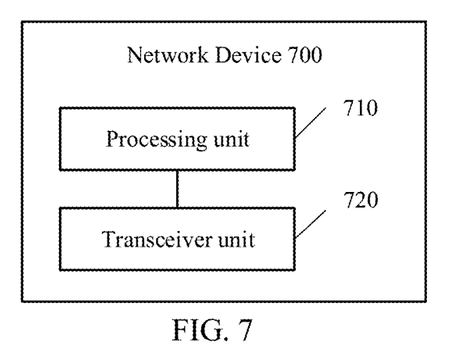
FIG. 7 is a schematic block diagram of a network device according to an embodiment of the present application.

FIG. 7 is a schematic block diagram of a terminal device 700 according to an embodiment of the present application. As shown in FIG. 7, the network device 700 includes a processing unit 710 and a transceiver unit 720, wherein:

the processing unit 710 is configured to determine a plurality of DRX configurations, where the plurality of DRX configurations are used for the terminal device to determine at least one DRX configuration for detecting a physical downlink control channel (PDCCH); and the transceiver unit 720 is configured to send the plurality of DRX configurations determined by the processing unit 710 to the terminal device.

Therefore, a plurality of DRX configurations are sent to the terminal device, and the plurality of DRX configurations may be configured, for example, for one MAC entity, so that the terminal device can flexibly select an appropriate DRX configuration among the plurality of DRX configurations, and detect the PDCCH based on the selected DRX configuration, thereby improving the discontinuous reception performance of the terminal device and further reducing the power consumption of the terminal device.

Optionally, the plurality of DRX configurations are configured for a same media access control (MAC) entity.

Optionally, each DRX configuration in the plurality of DRX configurations corresponds to at least one resource configuration, and the at least one resource configuration includes at least one of the following configurations: a serving cell configuration, a bandwidth part (BWP) configuration, a control resource set (CORESET) configuration and a search space configuration;

wherein each DRX configuration and a resource configuration corresponding to each DRX configuration are used for the terminal device to detect the PDCCH.

Optionally, each DRX configuration includes an index of a resource configuration corresponding to the DRX configuration.

Optionally, each resource configuration includes an index of the DRX configuration corresponding to the resource configuration.

Optionally, the transceiving unit 720 is further configured to send indication information to the terminal device, where the indication information is used to indicate the at least one DRX configuration.

Optionally, the indication information is carried in downlink control information (DCI), media access control (MAC) control element (CE), or radio resource control (RRC) signaling.

Optionally, the at least one resource configuration corresponding to each DRX configuration includes BWP configurations belonging to the same serving cell and/or BWP configurations belonging to different serving cells; the at least one resource configuration includes CORESET configurations belonging to the same BWP and/or CORESET configurations belonging to different BWPs; and/or the at least one resource configuration includes search space configurations belonging to the same BWP and/or search space configurations belonging to different BWPs.

Optionally, each DRX configuration includes at least one of the following parameters: drx-onDurationTimer, drx-SlotOffset, drx-StartOffset, drx-InactivityTimer, drx-RetransmissionTimerDL, drx-RetransmissionTimerUL, drx-LongCycle, drx-ShortCycle, drx-ShortCycleTimer, drx-HARQ-RTT-TimerDL, drx-HARQ-RTT-TimerUL, and mac-ContentionResolutionTimer.

It should be understood that the network device 700 can perform the corresponding operations performed by the network device in the foregoing method 500, which will be not be repeated here for the sake of brevity.

Figure 8:
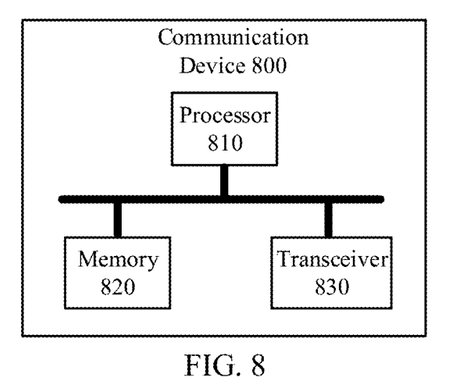
FIG. 8 is a schematic structural diagram of a communication device according to an embodiment of the present application.

FIG. 8 is a schematic structural diagram of a communication device 800 according to an embodiment of the present application. The communication device 800 shown in FIG. 8 includes a processor 810. The processor 810 can call and execute a computer program from a memory to carry out the methods in the embodiments of the present application.

Optionally, as shown in FIG. 8, the communication device 800 can further include a memory 820. The processor 810 can call and run the computer program from the memory 820 to carry out the methods in the embodiments of the present application.

The memory 820 can be a separate device independent of the processor 810, or can be integrated in the processor 810.

Optionally, as shown in FIG. 8, the communication device 800 can further include a transceiver 830, and the processor 810 can control the transceiver 830 to communicate with other devices, and specifically to transmit information or data to other devices, or receive information or data transmitted from other devices.

The transceiver 830 can include a transmitter and a receiver. The transceiver 830 can further include one or more antennas.

Optionally, the communication device 800 can specifically be a terminal device in the embodiments of the present application, and the communication device 800 can carry out the corresponding processes which are implemented by the terminal device in the methods of the embodiments of the present application, which will not be repeated here for the sake of brevity.

Optionally, the communication device 800 can specifically be a network device in the embodiments of the present application, and the communication device 800 can carry out the corresponding processes which are implemented by the network device in the methods of the embodiments of the present application, which will not be repeated here for the sake of brevity.

Figure 9:
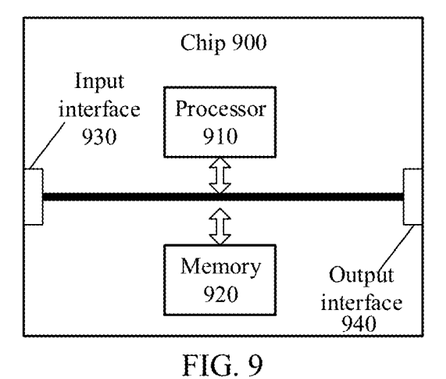
FIG. 9 is a schematic structural diagram of a chip according to an embodiment of the present application.

FIG. 9 is a schematic structural diagram of a chip according to an embodiment of the present application. The chip 900 shown in FIG. 9 includes a processor 910 which can invoke and run a computer program from a memory to implement the methods in the embodiments of the present application.

Optionally, as shown in FIG. 9, the chip 900 can further include a memory 920. The processor 910 can invoke and run the computer program from the memory 920 to implement the methods in the embodiments of the present application.

The memory 920 can be a separate device independent of the processor 910, or can be integrated in the processor 910.

Optionally, the chip 900 can further include an input interface 930. The processor 910 can control the input interface 930 to communicate with other devices or chips, and particularly to obtain information or data transmitted by other devices or chips.

Optionally, the chip 900 can further include an output interface 940. The processor 910 can control the output interface 940 to communicate with other devices or chips, and particularly to output information or data to other devices or chips.

Optionally, the chip can be applied to the terminal device in the embodiments of the present application, and the chip can carry out the corresponding processes which are implemented by the terminal device in the methods of the embodiments of the present application, which will not be repeated here for the sake of brevity.

Optionally, the chip can be applied to the network device in the embodiments of the present application, and the chip can carry out the corresponding processes which are implemented by the network device in the methods of the embodiments of the present application, which will not be repeated here for the sake of brevity.

It should be understood that the chip mentioned in the embodiments of the present application can also be referred to as a system-level chip, a system chip, a chip system, or a system-on-chip.

It should be understood that the processor according to the embodiments of the present application can be an integrated circuit chip with signal processing capability. In the implementations, the steps of the foregoing method embodiments can be performed by an integrated logic circuit of hardware in the processor or by instructions in a form of software. The foregoing processor can be a general-purpose processor, a Digital Signal Processor (DSP), an Application Specific Integrated Circuit (ASIC), a Field Programmable Gate Array (FPGA), another programmable logic device, discrete gate or transistor logic device, or a discrete hardware component, which can implement the methods, steps, and logical blocks disclosed in the embodiments of the present disclosure. The general-purpose processor can be a microprocessor, any conventional processor or the like. The steps of the methods disclosed in connection with the embodiments of the present disclosure can be directly embodied in and performed by a hardware decoding processor, or can be implemented by a combination of hardware and software modules in the decoding processor. The software modules can be located in a mature storage medium in the art such as a random access memory, a flash memory, a read-only memory, a programmable read-only memory, an electrically erasable programmable memory or a register. The storage medium is located in the memory, and the processor reads information in the memory and implements the steps of the above methods in combination with the hardware thereof.

It can be understood that the memory in the embodiments of the present application may be a volatile memory or a non-volatile memory, or may include both the volatile and non-volatile memories. In an embodiment, the non-volatile memory can be a Read-Only Memory (ROM), a Programmable ROM (PROM), an erasable PROM (EPROM), an electrically EPROM (EEPROM) or a flash memory. The volatile memory may be a Random Access Memory (RAM), which is used as an external cache. By way of exemplary but not restrictive description, many forms of RAMs are available, such as a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM)) and a Direct Rambus RAM (DR RAM). It should be noted that the memories of the systems and methods described herein are intended to include, but are not limited to, these and any other suitable types of memories.

It should be understood that the foregoing description of the memory is exemplary rather than limiting. For example, the memory in the embodiments of the present disclosure can also be a Static RAM (SRAM), a Dynamic RAM (DRAM), a Synchronous DRAM (SDRAM), a Double Data Rate SDRAM (DDR SDRAM), an Enhanced SDRAM (ESDRAM), a Synch-Link DRAM (SLDRAM), a Direct Rambus RAM (DR RAM), among others. That is to say, the memory in the embodiments of the present disclosure is intended to include but is not limited to those and any other suitable types of memories.

Figure 10:
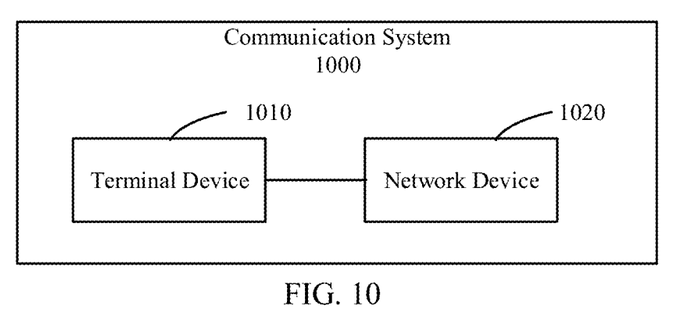
FIG. 10 is a schematic structural diagram of a communication system according to an embodiment of the present application.

FIG. 10 is a schematic block diagram of a communication system 1000 according to an embodiment of the present application. As shown in FIG. 10, the communication system 1000 includes a terminal device 1010 and a network device 1020.

The terminal device 1010 is configured to: determine at least one DRX configuration in a plurality of DRX configurations; and detect a PDCCH according to the at least one DRX configuration.

The network device 1020 is configured to send the plurality of DRX configurations to the terminal device, where the plurality of DRX configurations are used for the terminal device to determine the at least one DRX configuration for detecting the physical downlink control channel (PDCCH).

The terminal device 1010 can be used to implement the corresponding functions implemented by the terminal device in the above method 300, and the composition of the terminal device 1010 can be as shown in the terminal device 600 in FIG. 6, which will not be repeated here for the sake of brevity.

The network device 1020 can be used to implement the corresponding functions implemented by the network device in the above method 500, and the composition of the network device 1020 can be as shown in the network device 700 in FIG. 7, which will not be repeated here for the sake of brevity.

The embodiments of the present application also provide a computer readable storage medium for storing a computer program. Optionally, the computer readable storage medium may be applied to the network device in the embodiments of the present application, and the computer program causes a computer to perform the corresponding processes implemented by the network device in the methods of the embodiments of the present application, which will not be repeated here for the sake of brevity. Optionally, the computer readable storage medium may be applied to the terminal device in the embodiments of the present application, and the computer program causes the computer to perform the corresponding processes implemented by the terminal device in the methods of the embodiments of the present application, which will not be repeated here for the sake of brevity.

The embodiments of the present application also provide a computer program product, including computer program instructions. Optionally, the computer program product can be applied to the network device in the embodiments of the present application, and the computer program instructions cause the computer to perform the corresponding processes implemented by the network device in the methods according to the embodiments of the present application, which will not be repeated here for the sake of brevity. Optionally, the computer program product can be applied to the terminal device in the embodiments of the present application, and the computer program instructions cause the computer to perform the corresponding processes implemented by the terminal device in the methods according to the embodiments of the present application, which will not be repeated here for the sake of brevity.

The embodiments of the present application also provide a computer program. Optionally, the computer program can be applied to the network device in the embodiments of the present application. When running on a computer, the computer program causes a computer to perform the corresponding processes implemented by the network device in the methods of the embodiments of the present application, which will not be repeated here for the sake of brevity. Optionally, the computer program can be applied to the terminal device in the embodiments of the present application. When running on a computer, the computer program causes the computer to perform the corresponding processes implemented by the terminal device in the methods of the embodiments of the present application, which will not be repeated here for the sake of brevity.

It should be understood that the terms "system" and "network" are often used interchangeably herein. The term "and/or" used herein is merely to describe relative relationships of relative objects, indicating that there can be three kinds of relationships. For example, A and/or B can indicate three cases where A exists alone, A and B exist simultaneously, or B exists alone. In addition, the character "I" used herein generally indicates that the related objects before and after this character are in an "or" relationship.

It should also be understood that, in the embodiments of the present invention, "A corresponding to B" means that A is associated with B, and A can be determined from B. However, it should also be understood that determining A from B does not mean that A is determined only from B, and A can also be determined from B and/or other information.

Those of ordinary skill in the art can recognize that the exemplary units and algorithm steps described in connection with the embodiments disclosed herein can be implemented in electronic hardware or a combination of computer software and the electronic hardware. Whether these functions are implemented in hardware or software depends on the specific applications of the technical solutions and design constraints. Various methods can be used by professional technicians to implement the described functions for each specific application, and such implementations should not be considered as going beyond the scope of the present disclosure.

Those skilled in the art can clearly understand that for the convenience and conciseness of the description, for the specific operating process of the systems, devices and units described above, reference can be made to corresponding process in the foregoing method embodiments, which will not be repeated here.

According to the embodiments provided in the present application, it should be understood that the systems, devices, and methods disclosed can be implemented in other manners. For example, the device embodiments described above are merely illustrative. For example, the division of the units is only a logical function division, and in actual implementations, there can be other division manners. For example, a plurality of units or components can be combined or integrated into another system, or some features can be ignored or not implemented. In addition, the coupling or direct coupling or communication connection shown or discussed herein can also be indirect coupling or communication connection through some interfaces, devices or units, and can be in electrical, mechanical or other forms.

The units described as separate components may be or may not be physically separated, and the components shown as units may be or may not be physical units, that is, they may be located in one place or may be distributed on multiple network units. Some or all of the units can be selected to achieve the objectives of the solutions of the embodiments according to actual requirements.

In addition, the functional units in the embodiments of the present disclosure can be integrated into one processing unit, or each unit can individually exist physically, or two or more of the units can be integrated into one unit.

If implemented in the form of software functional units and sold or used as an independent product, the functions can be stored in a computer-readable storage medium. Based on such understanding, the technical solution of the present disclosure essentially, a part thereof that contributes to the prior art, or a part of the technical solution can be embodied in the form of a software product, and the computer software product is stored in a storage medium and includes instructions which enable a computer device (which may be a personal computer, a server, a network device or the like) to perform all or part of the steps of the methods described in the embodiments of the present disclosure. The foregoing storage medium includes various medium such as a USB drive, a removable hard disk, a ROM, a RAM, a magnetic disk or an optical disc that can store program codes.

Those described above are only specific implementations of the present disclosure, and the protection scope of the present disclosure is not limited thereto. Any alteration or replacement readily devised by a person skilled in the art within the technical scope disclosed in the present disclosure shall fall within the scope of the present disclosure. Therefore, the protection scope of the present disclosure shall be subject to the protection scope of the claims.

What is claimed is:

1. A method for Discontinuous Reception (DRX), comprising:
    determining, by a terminal device, at least one DRX configuration in a plurality of DRX configurations; and
    detecting, by the terminal device, a Physical Downlink Control Channel (PDCCH) according to the at least one DRX configuration;
    wherein each DRX configuration in the plurality of DRX configurations corresponds to at least one resource configuration, and the at least one resource configuration comprises at least one of the following: a serving cell configuration, a Bandwidth Part (BWP) configuration, a Control Resource Set (CORESET) configuration and a search space configuration;
    wherein the detecting, by the terminal device, the PDCCH according to the at least one DRX configuration comprises:
        detecting, by the terminal device, the PDCCH according to each DRX configuration and the resource configuration corresponding to each DRX configuration.

2. The method according to claim 1, wherein the plurality of DRX configurations are configured for a same Media Access Control (MAC) entity.

3. The method according to claim 1, wherein each DRX configuration comprises an index of the resource configuration corresponding to the DRX configuration.

4. The method according to claim 1, wherein each resource configuration comprises an index of the DRX configuration corresponding to the resource configuration.

5. The method according to claim 1, wherein the determining, by the terminal device, the at least one DRX configuration in the plurality of DRX configurations comprises:
    determining, by the terminal device, the at least one DRX configuration according to an activated and/or deactivated resource configuration, wherein the at least one resource configuration corresponding to each DRX configuration in the at least one DRX configuration comprises the activated resource configuration and does not comprise the deactivated resource configuration.

6. The method according to claim 1, wherein the determining, by the terminal device, the at least one DRX configuration in the plurality of DRX configurations comprises:
    determining, by the terminal device, the at least one DRX configuration according to indication information received from a network device, wherein the indication information indicates an activated and/or deactivated DRX configuration, and the at least one DRX configuration comprises the activated DRX configuration and does not comprise the deactivated DRX configuration.

7. The method according to claim 6, wherein the indication information is carried in Downlink Control Information (DCI), Media Access Control (MAC) Control Element (CE), or Radio Resource Control (RRC) signaling.

8. The method according to claim 6, further comprising:
    activating, by the terminal device, a first resource configuration, wherein the first resource configuration corresponds to the activated DRX configuration; and/or,
    deactivating, by the terminal device, a second resource configuration, wherein the second resource configuration corresponds to the deactivated DRX configuration.

9. The method according to claim 1, further comprising:
    receiving, by the terminal device, the plurality of DRX configurations sent by a network device; or
    obtaining, by the terminal device, the plurality of DRX configurations pre-stored in the terminal device.

10. The method according to claim 1, wherein:
    the at least one resource configuration corresponding to each DRX configuration comprises BWP configurations belonging to a same serving cell and/or BWP configurations belonging to different serving cells; and/or,
    the at least one resource configuration comprises CORESET configurations belonging to a same BWP and/or CORESET configurations belonging to different BWPs; and/or
    the at least one resource configuration comprises search space configurations belonging to a same BWP and/or search space configurations belonging to different BWPs.

11. The method according to claim 1, wherein each DRX configuration comprises at least one of the following parameters:
    drx-onDurationTimer, drx-SlotOffset, drx-StartOffset, drx-InactivityTimer, drx-RetransmissionTimerDL, drx-RetransmissionTimerUL, drx-LongCycle, drx-ShortCycle, drx-ShortCycleTimer, drx-HARQ-RTT-TimerDL, drx-HARQ-RTT-TimerUL, and mac-ContentionResolutionTimer.

12. A method for Discontinuous Reception (DRX), comprising:
    sending, by a network device, a plurality of DRX configurations to a terminal device, the plurality of DRX configurations being used for the terminal device to determine at least one DRX configuration for detecting a Physical Downlink Control Channel (PDCCH);

wherein each DRX configuration in the plurality of DRX configurations corresponds to at least one resource configuration, and the at least one resource configuration comprises at least one of the following: a serving cell configuration, a Bandwidth Part (BWP) configuration, a Control Resource Set (CORESET) configuration and a search space configuration; and wherein each DRX configuration and a resource configuration corresponding to the DRX configuration are used for the terminal device to detect the PDCCH.

13. The method according to claim 12, wherein the plurality of DRX configurations are configured for a same Media Access Control (MAC) entity.

14. The method according to claim 12, further comprising:

sending, by the network device, indication information to the terminal device, wherein the indication information indicates the at least one DRX configuration.

15. The method according to claim 14, wherein the indication information is carried in Downlink Control Information (DCI), Media Access Control (MAC) Control Element (CE), or Radio Resource Control (RRC) signaling.

16. The method according to claim 12, wherein:

the at least one resource configuration corresponding to each DRX configuration comprises BWP configurations belonging to a same serving cell and/or BWP configurations belonging to different serving cells;

the at least one resource configuration comprises CORESET configurations belonging to a same BWP and/or CORESET configurations belonging to different BWPs; and/or the at least one resource configuration comprises search space configurations belonging to a same BWP and/or search space configurations belonging to different BWPs.

17. The method according to claim 12, wherein each DRX configuration comprises at least one of the following parameters:

drx-onDurationTimer, drx-SlotOffset, drx-StartOffset, drx-InactivityTimer, drx-RetransmissionTimerDL, drx-RetransmissionTimerUL, drx-LongCycle, drx-ShortCycle, drx-ShortCycleTimer, drx-HARQ-RTT-TimerDL, drx-HARQ-RTT-TimerUL, and mac-ContentionResolutionTimer.

18. A terminal device comprising a processor and a memory for storing a computer program, wherein the processor is configured to:

determine at least one DRX configuration in a plurality of DRX configurations; and detect a Physical Downlink Control Channel (PDCCH) according to the at least one DRX configuration;

wherein each DRX configuration in the plurality of DRX configurations corresponds to at least one resource configuration, and the at least one resource configuration comprises at least one of the following: a serving cell configuration, a Bandwidth Part (BWP) configuration, a Control Resource Set (CORESET) configuration and a search space configuration;

wherein the processor is further configured to:

detect the PDCCH according to each DRX configuration and the resource configuration corresponding to each DRX configuration.

* * * * *